United States Patent [19]

Kozuka et al.

[11] Patent Number: 4,778,147

[45] Date of Patent: Oct. 18, 1988

[54] ELECTROMAGNETIC SOLENOID

[75] Inventors: Hajime Kozuka, Okazaki; Tadayuki Hara; Isao Yamamoto, both of Himeji, all of Japan

[73] Assignees: Mitsubishi Jidosha Kogyo Kabushiki Kaisha; Mitsubishi Denki Kabushiki Kaisha, both of Japan

[21] Appl. No.: 888,475

[22] Filed: Jul. 23, 1986

[30] Foreign Application Priority Data

| | | | |
|---|---|---|---|
| Jul. 27, 1985 | [JP] | Japan | 60-115523[U] |
| Jul. 27, 1985 | [JP] | Japan | 60-115524 |
| Jul. 27, 1985 | [JP] | Japan | 60-115527[U] |

[51] Int. Cl.[4] .......... F16K 31/06

[52] U.S. Cl. .......... 251/129.08; 251/129.15; 137/625.65

[58] Field of Search .......... 251/129.15, 129.08; 137/625.65

[56] References Cited

U.S. PATENT DOCUMENTS

| | | | |
|---|---|---|---|
| 3,732,893 | 5/1973 | Ziesche et al. | 137/625.65 |
| 3,791,408 | 2/1974 | Saitou et al. | 251/129.15 X |
| 4,250,922 | 2/1981 | Will et al. | 251/129.15 X |

FOREIGN PATENT DOCUMENTS

| | | | |
|---|---|---|---|
| 166184 | 10/1983 | Japan | 251/129.15 |
| 1395342 | 5/1975 | United Kingdom | 251/129.15 |

*Primary Examiner*—Arnold Rosenthal

*Attorney, Agent, or Firm*—Leydig, Voit & Mayer

[57] ABSTRACT

An electromagnetic solenoid for a fluid control valve includes a cylindrical casing accommodating a solenoid coil and having an end wall formed at its one end and which is open at its other end, the open end of the casing being closed by an end cap. A fixed iron core is disposed in and fixedly mounted on the casing. An output rod is disposed in the casing with its one end extending outwardly through the casing end wall for connection with a valve member of the fluid control valve. The output rod slidably extends through the fixed iron core and is supported on its opposite ends by a slide bearing disposed in the end wall of the casing and by a slide ball bearing disposed in the end cap member. A movable iron core is received in the solenoid coil for axial sliding movement and is firmly mounted on the output rod in a face-to-face relation with the fixed iron core at a location such that the distance between the center of the movable iron core and the slide ball bearing is less than the distance between the center of the movable iron core and the slide bearing. The output rod and the slide bearing in the casing end wall are formed of a non-magnetic material.

In one embodiment, the end wall of the casing has a fluid passage formed therethrough for providing fluid communication between the interior of the casing and the outside. In another embodiment, the slide bearing in the end wall of the casing has a fluid passage formed therethrough for providing fluid communication between the interior of the casing and the housing bore.

8 Claims, 2 Drawing Sheets

ELECTROMAGNETIC SOLENOID

BACKGROUND OF THE INVENTION

1. Field of the Invention

The present invention relates to an electromagnetic solenoid adapted to be coupled to a fluid control valve such as a flow-rate control valve, a fluid pressure control valve, a changeover valve or the like for controlling a flow rate, fluid pressure, or flow direction of fluid.

2. Description of the Prior Art

FIG. 4 is a cross sectional view showing a conventional electromagnetic solenoid. In this Figure, reference numeral 1 designates a cylindrical casing having a fixed iron core 2 integrally formed with its end wall 1*a*, the casing 1 being closed at its open end opposite the end wall 1*a* by an end plate 3. The casing 1, the fixed iron core 2 and the end plate 3 are adapted to jointly form a magnetic circuit. Housed in the casing 1 is a solenoid coil 4 which is wound around a winding frame or a bobbin 5 formed of synthetic resin. A movable iron core 6 is fixedly connected with an output rod 7 extending through and supported by the fixed iron core 2 for axial sliding movement relative thereto. Firmly fitted in the inner peripheral surface of the winding frame 5 is a sleeve 9 formed of a non-magnetic material for supporting the movable iron core 6 for axial sliding movement. The movable iron core 6 is biased toward the fixed iron core 2 under the action of a biasing spring 10.

The electromagnetic solenoid constructed in the above manner is to be connected with a fluid control valve which is generally designated by reference numeral 11. The fluid control valve 11 includes a valve housing 12 which has a stepped axial bore 13 formed therein. The stepped axial bore 13 includes a small-diameter portion 13*a* and a large-diameter portion 13*b*. The fixed iron core 2 of the electromagnetic solenoid is thread-engaged in the large-diameter bore 13*b* in the valve housing 12. The valve housing 12 has three fluid conduits 12*a*, 12*b* and 12*c* opening into the small-diameter bore 13*a*. Slidably fitted in the small-diameter bore 13*a* is a valve member 14 in the form of a spool for controlling the communication of the respective fluid conduits 12*a*, 12*b* and 12*c* with the small-diameter bore 13*a*. The valve member 14 is connected with the output rod 7 and urged in the leftward direction in FIG. 4 under the action of a return spring 15 which is stronger than the spring 10 so that the movable iron core 6 is biased in the direction away from the fixed iron core 2 when the solenoid coil 4 is not energized.

The conventional electromagnetic solenoid coupled with the fluid control valve 11 in the above manner operates as follows. When the solenoid coil 4 is energized, the movable iron core 6 is magnetically attracted toward the fixed iron core 2 against the biasing force of the return spring 15 arranged in the valve housing 12 so that the output rod 7 is likewise caused to move in the direction indicated by an arrow C, in FIG. 4 thereby controlling or changing the communication of the fluid conduits 12*a*, 12*b* and 12*c* with the axial bore 13. In this case, it is to be noted that the confronting surfaces of the fixed and movable iron cores 2 and 6 are tapered to form a conical configuration so that the magnetic attraction force generated by the solenoid coil 4 and acting between the fixed and movable iron cores 2 and 6 increases in proportion to both the amount of the advancing or leftward movement of the output rod 7 and an increase in intensity of the current flowing through the solenoid coil 4.

With the above-described conventional electromagnetic solenoid, however, there have been the following problems. Specifically, the solenoid coil 4 creates, upon energization thereof, a magnetic attraction force acting between the fixed and movable iron cores 2 and 6 so that the movable iron core 6 is displaced axially by an axial component of the magnetic force and radially by a radial component of the magnetic force which generally acts in a non-uniform pattern radially around the circumference of the movable iron core 6. As a result, the output rod 7 becomes more or less cocked and is thus subjected to a greater frictional resistance from the inner surface of the through bore 1*b* in the fixed iron core 2 so that the axial force required for causing a specified amount of axial movement of the output rod 7 during the advancing stroke (the rightward stroke in FIG. 4) thereof is made different from that during the return stroke (the leftward stroke in FIG. 4) in which the solenoid coil 4 is deenergized and the magnetic attraction force between the fixed and movable iron cores 2 and 6 disappears. This is clear in the graph illustrated in FIG. 5 in which the axial force of the output rod 7 is plotted as the ordinate and the amount of movement of the output rod 7 is plotted as the abscissa. In other words, the relationship between the axial force acting on the output rod 7 and the amount of resulting axial movement of the output rod 7 is such that hysteresis in the sliding motion of the output rod 7 relative to the axial force required during axial sliding reciprocation of the output rod 7 is great, that is the difference in the axial force required to cause a specified amount of axial movement of the output rod 7 during the advancing stroke and the returning stroke is great. Consequently, when the amount of axial movement of the output rod 7 is to be controlled in terms of the intensity of the current flowing through the solenoid coil 4, the amount of axial movement of the output rod 7 due to the coil current of the same intensity during the advancing stroke (the rightward movement in FIG. 4) of the output rod 7 is considerably different from that during the returning stroke (the leftward movement in FIG. 4) so that it is difficult to precisely control the amount of axial movement of the output rod 7 by adjustment of the coil current.

Moreover, powder of magnetic material, produced by the friction of repeated sliding reciprocations of the output rod 7 relative to the fixed iron core 2 is contained in the operating fluid and this powder is liable to be magnetically attracted and adhered to the fixed iron core 2, and particularly to the inner peripheral surface of the through bore 1*b* in the fixed iron core 2 and/or the outer peripheral surface of the output rod 7 so that smooth axial sliding movement of the output rod 7 relative to the fixed iron core 2 is considerably impaired by the thus adhered powder.

In addition, as the output rod 7 moves in the opposite axial directions, operating fluid in the large-diameter bore 13*b* in the valve housing 12 flows therefrom into a space 5*a* defined by the inner peripheral surface of the winding frame 5 through an annular clearance between the inner peripheral surface of the through bore 1*b* and the outer peripheral surface of the output rod 7 or vice versa. Consequently, the area of the fluid passage or annular clearance communicating between the large-diameter bore 13*b* in the valve housing 12 and the space 5*a* inside the winding frame 5 is limited, thus providing a relatively large resistance to the fluid flow passing through the annular clearance during axial movements of the movable iron core 6 with the result that smooth axial sliding motion of the movable iron core 6 is impaired reducing the responsiveness thereof to a material extent.

SUMMARY OF THE INVENTION

The present invention is intended to obviate the above-mentioned problems of the prior art.

A primary object of the present invention is to provide an electromagnetic solenoid for a fluid control valve in which hysteresis in the axial movement of the output rod induced by the current flowing through the solenoid coil is materially improved so that the amount of axial movement of the output rod, and therefore the amount of movement of the movable iron core mounted thereon, can be controlled in a most precise manner in response to the intensity of the coil current.

Another object of the present invention is to provide an electromagnetic solenoid for a fluid control valve in which any magnetic powder contained in the operating fluid is securely prevented from being magnetically adhered to the outer peripheral surface of the output rod and the inner peripheral surface of the through bore in the casing end wall through which the output rod extends, thereby ensuring the smooth sliding movement of the output rod.

A further object of the present invention is to provide an electromagnetic solenoid for a fluid control valve in which resistance to the operating fluid flowing from a fluid control valve into the electromagnetic solenoid or vice versa is effectively minimized to further improve the smooth sliding motion of the output rod as well as the responsiveness thereof.

Accordingly, the present invention provides an electromagnetic solenoid which is adapted to be coupled to a fluid control valve for controlling the operation of the valve and which comprises a cylindrical casing, and end cap member, a hollow solenoid coil, and a fixed iron core. The cylindrical casing has an end wall formed at one end and is open at the other end. The end cap member is attached to the open end of the casing, closing the open end of the casing, and is adapted to cooperate with the casing to form a yoke for a magnetic circuit. The hollow solenoid coil is accommodated in the casing and the fixed iron core is disposed in and fixedly mounted on the casing. The electromagnetic solenoid further comprises a slide bearing, a slide ball bearing, an output rod, and a movable iron core. The slide bearing is disposed in the end wall of the casing and the slide ball bearing is disposed in the end cap member. The output rod, which is supported on its opposite ends by the slide bearing and the slide ball bearing, is disposed in the casing with one end extending outwardly through the end wall of the casing. The output rod extends through and is capable of sliding relative to the fixed iron core and includes a small-diameter portion and a large-portion with a stepped shoulder defined between the two portions. The movable iron core is received in the solenoid coil and is firmly mounted on the output rod in a face-to-face relation with the fixed iron core at a location such that the distance between the center of the movable iron core and the slide ball bearing is less than the distance between the center of the movable iron core and the slide bearing. The movable iron core is mounted on and capable of sliding relative to the small-diameter portion of the output rod. The electromagnetic solenoid further comprises a device for biasing the movable iron core against the stepped shoulder of the output rod.

The invention further provides an electromagnetic solenoid which is adapted to be coupled to a fluid control valve for controlling the operation of the valve and which comprises a cylindrical casing, an end cap member, a hollow solenoid coil, and a fixed iron core. The cylindrical casing has an end wall formed at one end and is open at the other end. The end cap member is attached to the open end of the casing, closing the open end, and is adapted to cooperate with the casing to form a yoke for a magnetic circuit. The solenoid coil is accommodated in the casing and the fixed iron core is disposed in and fixedly mounted on the casing. The electromagnetic solenoid further comprises a slide bearing, a slide ball bearing, an output rod, and a movable iron core. The slide bearing is disposed in the end wall of the casing and the slide ball bearing is disposed in the end cap member. The output rod, which is supported on its opposite ends by the slide bearing and the slide ball bearing, is disposed in the casing with its one end extending outwardly through the end wall of the casing. The output rod extends through and is capable of sliding relative to the fixed iron core. The movable iron core is received in the solenoid coil and is firmly mounted on the output rod in a face-to-face relation with respect to the fixed iron core. The movable iron core is mounted on the output rod at a location such that the distance between the center of the movable iron core and the slide ball bearing is less than the distance between the center of the movable iron core and the slide bearing. The control valve includes a valve housing and a valve member. The valve housing is adapted to be connected with the end wall of the casing and has a bore. The valve member is received in and capable of sliding within the housing bore and is adapted to be coupled to the output rod. The slide bearing in the end wall of the casing has a fluid passage formed therethrough for providing fluid communication between the interior of the casing and the housing bore.

It is preferred that the slide bearing in the casing end wall is formed of a non-magnetic material.

It is also preferred that the output rod is formed of a non-magnetic material.

In one embodiment, the fluid control valve includes a valve housing which is adapted to be connected with the end wall of the casing, and has a bore formed therein. The fluid control valve also includes a valve member slidably received in the housing bore and adapted to be coupled to the output rod. The end wall of the casing has a fluid passage formed therethrough for providing fluid communication between the interior of the casing and the housing bore.

In another embodiment, the fluid control valve includes a valve housing which is adapted to be connected with the end wall of the casing and has a bore formed therein. The fluid control valve also includes a valve member slidably received in the housing bore and adapted to be coupled to the output rod. The slide bearing in the end wall of the casing has a fluid passage formed therethrough for providing fluid communication between the interior of the casing and the housing bore.

In another embodiment, the output rod includes a small-diameter portion and a large-diameter portion with a stepped shoulder defined therebetween. The movable iron core is slidably mounted on the small-diameter portion and biased by a biasing device against the stepped shoulder on the output rod.

The above and other objects, features and advantages of the present invention will become apparent from the following detailed description of a few presently preferred embodiments of the invention when taken in conjunction with the accompanying drawings.

DESCRIPTION OF THE PREFERRED EMBODIMENTS

Figure 1:
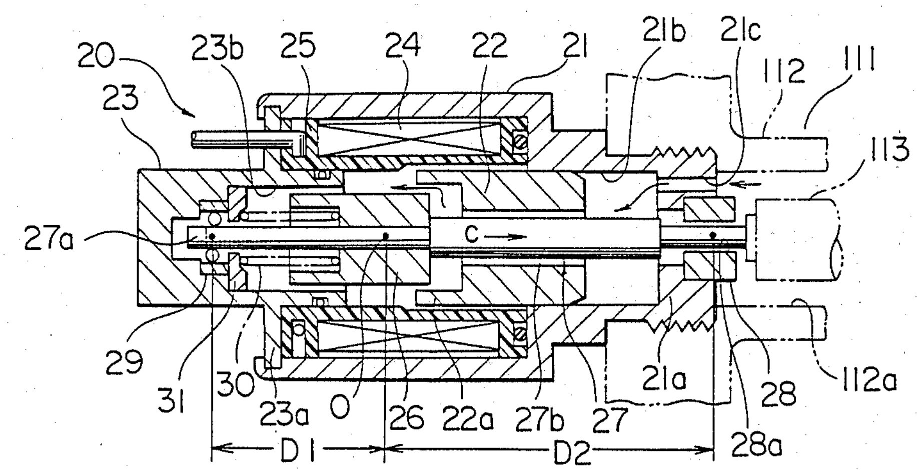
FIG. 1 is a cross sectional view showing an electromagnetic solenoid in accordance with the present invention.

In FIG. 1, there is shown an electromagnetic solenoid constructed in accordance with the principles of the present invention. The electromagnetic solenoid, generally designated by reference numeral 20, includes a cylindrical casing 21 which is formed of a magnetic material and which constitutes a yoke. The casing 21 has an end wall 21*a* at its one end and is open at its other end, the open end of the casing 21 being closed by a cylindrical end cap member 23 formed of a magnetic material. The end cap member 23 has a radially outwardly projected annular flange 23*a* which is detachably secured to the open end of the casing 21, the casing 21 and the end cap member 23 being adapted to form a magnetic circuit.

Accommodated in the casing 21 is a fixed iron core 22 of a cylindrical configuration which is formed of a magnetic material and which is integrally formed at its one end with an axially extending annular extension 22*a*. The fixed iron core 22 is slightly tapered at its other end and is press fitted into a cylindrical insertion bore 21*b* defined in the end wall 21*a* of the casing 21. Housed in the casing 21 is a solenoid coil 24 which is wound around a winding frame or a bobbin 25 formed of synthetic resin which is disposed so as to surround both a portion of the outer peripheral surface of the end cap member 23 and a portion of the outer peripheral surface of the fixed iron core 22.

An output rod 27 is disposed axially in the casing 21 and extends at its one end outwardly through the casing end wall 21*a*. The output rod 27 is formed of a non-magnetic material such as stainless steel so that any magnetic powder contained in the operating fluid can not be magnetically attracted and adhered to the outer peripheral surface of the output rod 27. The output rod 27 has a small-diameter portion 27*a* and a large-diameter portion 27*b* with a stepped shoulder 27*c* defined therebetween and is slidably supported at its one end by a slide bearing 28 in the form of a plain bearing disposed in the casing end wall 21*a* and at its other end by a slide bearing 29 in the form of a slide ball bearing disposed in the end cap member 23. The slide bearing 28 is formed of a non-magnetic material and has its outer end extended from the outer end surface of the casing end wall 21*a* so as to prevent any magnetic powder in the operating fluid from being magnetically attracted to the inner peripheral sliding surface 28*a* of the slide bearing 28.

Slidably mounted on the small-diameter portion 27*a* of the output rod 27 is a cylindrical-shaped movable iron core 26 which has one end thereof disposed in the axial annular extension 22*a* of the fixed iron core 22 in a face-to-face relation with the adjacent end surface of the fixed iron core 22. The movable iron core 26 is biased against the stepped shoulder 27*c* on the output rod 27 under the action of a biasing means 30 in the form of a coiled compression spring which is disposed under compression between the other end of the movable iron core 26 and an annular spring seat 31 of a non-magnetic material fixedly mounted on the inner peripheral surface of an axial bore 23*b* in the end cap member 23. The spring seat 31 also acts as a stop for preventing falling out of the slide ball bearing 29.

In this connection, it should be noted that the output rod 27 is slidably supported at the opposite ends thereof by the slide bearings 28 and 29 such that the distance D1 between the center O of the movable iron core 26 and the slide ball bearing 29 is less than the distance D2 between the center O of the movable iron core 26 and the plain bearing 28.

A fluid passage 21*c* in the form of a through hole is formed through the casing end wall 21*a* for providing fluid communication between the bore 21*b* in the casing 21 and the outside.

The electromagnetic solenoid 20 as constructed in the above-described manner is to be connected with a fluid control valve 111 with the outwardly projected end of the output rod 27 being coupled to a valve member 113 slidably received in an axial bore 112*a* defined in a valve housing 112 as illustrated by the phantom line in FIG. 1. In this connection, it is to be noted that the output rod 27 is urged in the leftward direction in FIG. 1 under the action of a return spring (not shown) disposed in the valve housing 112. With the electromagnetic solenoid 20 thus coupled with the fluid control valve 111, the bore 21*b* in the casing 21 is in fluid communication with the axial bore 112*a* in the valve housing 112 through the fluid passage 21*c* in the casing end wall 21*a*.

In operation, when the solenoid coil 24 is energized, the movable iron core 26 is magnetically attracted toward the fixed iron core 22 so that the output rod 27 is thereby caused to move in the rightward direction indicated by an arrow C against the return spring (not shown) disposed in the valve housing 112. As a result, the valve member 113 in the valve housing 112 is displaced axially for controlling the flow of the operating fluid in the valve housing 112 in an appropriate manner.

On the other hand, when the solenoid coil 24 is deenergized, the magnetic attraction force acting between the fixed and movable iron cores 22 and 26 collapses and the output rod 27 with the movable iron core 26 is caused to move in the leftward direction in FIG. 1 under the action of the return spring (not shown), thus returning to the initial position as illustrated in FIG. 1.

In this connection, it is to be noted that as the output rod 27 together with the movable iron core 26 moves axially, the operating field filled in the casing 21 and the valve housing 112 flows freely from the axial bore 112a in the valve housing 112 into the bore 21b in the casing 21 through the fluid passage 21c in the casing end wall 21a or vice versa so that the movable iron core 26 is freely displaceable in opposite axial directions without being subjected to any substantial resistance from the operating fluid.

Figure 3:
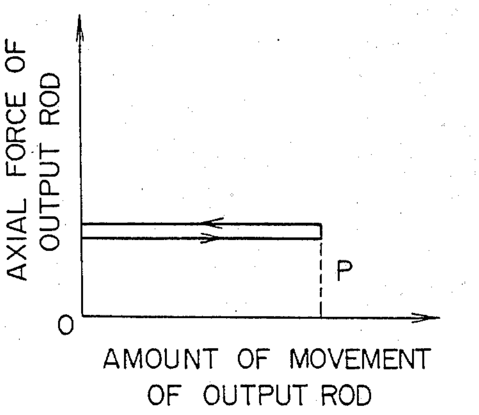
FIG. 3 is a graphic representation illustrating the hysteresis loop of the electromagnetic solenoid in FIG. 1, showing the relationship between the axial force of the output rod plotted as the ordinate and the amount of the axial movement of the output rod plotted as the abscissa.
Figure 4:
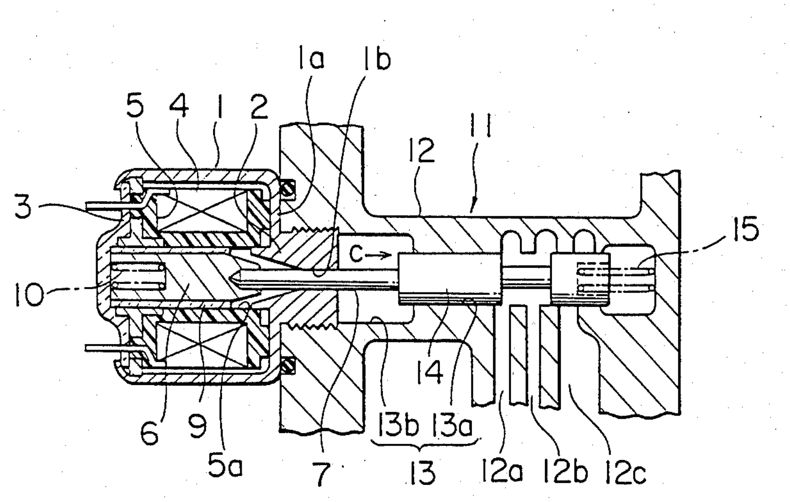
FIG. 4 PRIOR ART
FIG. 4 is a cross sectional view showing a conventional electromagnetic solenoid coupled with a fluid control valve.
Figure 5:
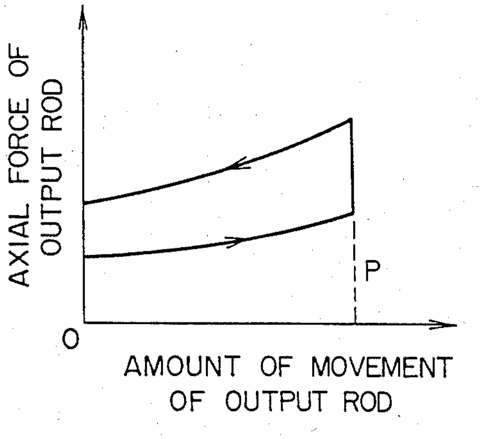
FIG. 5 PRIOR ART
FIG. 5 is a graphic representation illustrating the hysteresis loop of the electromagnetic solenoid in FIG. 4, showing the relationship between the axial force of the output rod plotted as the ordinate and the amount of the axial movement of the output rod plotted as the abscissa.

It will be appreciated that the slide ball bearing 29, being more costly than the plain bearing 28 but having an extremely low coefficient of friction, is disposed at a location much nearer to the movable iron core 26 than the plain bearing 28 is, so that unbalanced or non-uniform magnetic attraction force radially exerted on the movable iron core 26 by the fixed iron core 22 are mainly born by the slide ball bearing 29. Consequently, effects of such radially-acting unbalanced magnetic attraction forces exerted on the plain bearing 28, which has a relatively high coefficient of friction, are minimized to reduce the sliding resistance to the output rod 27 during axial movement thereof. Thus, hysteresis in the sliding motion of the output rod 27 relative to the magnetic attraction force acting between the fixed and movable iron cores 22 and 26 during axial sliding reciprocation of the output rod 27 can be substantially reduced, as clearly shown in FIG. 3, whereby it is possible to precisely control the amount of axial displacement of the output rod 27 in accordance with the intensity of the coil current irrespective of the direction of axial movement of the output rod 27.

Figure 2:
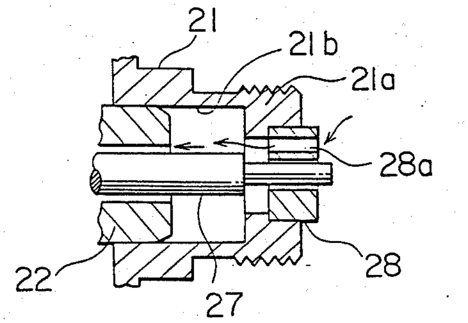
FIG. 2 is a cross sectional view showing a part of a modified electromagnetic solenoid in accordance with the present invention.

FIG. 2 shows a part of a modified form of an electromagnetic solenoid in which a fluid passage 28a in the form of a through hole is formed through the plain bearing 28 mounted on the casing end wall 21a.

It will be understood that the elelctromagnetic solenoid of the present invention as constructed above may also be used for controlling the opening and closing of a flow control valve, a fluid pressure control valve, a changeover valve or other like fluid control valves.

What is claimed is:

1. An electromagnetic solenoid adapted to be coupled to a fluid control valve for controlling the operation thereof, said electromagnetic solenoid comprising:
   - a cylindrical casing having an end wall formed at its one end and which is open at its other end;
   - an end cap member attached to the open end of said casing for closing thereof and adapted to cooperate with said casing to form a yoke for a magnetic circuit;
   - a hollow solenoid coil accommodated in said casing;
   - a fixed iron core disposed in and fixedly mounted on said casing;
   - a slide bearing disposed in the end wall of said casing;
   - slide ball bearing disposed in said end cap member;
   - an output rod disposed in said casing with its one end extending outwardly through the end wall of said casing, said output rod slidably extending through said fixed iron core, supported on its opposite ends by the slide bearing and the slide ball bearing, and including a small-diameter portion and large-diameter portion with a stepped shoulder defined therebetween;
   - a movable iron core received in said solenoid coil and firmly mounted on said output rod in a face-to-face relation with said fixed iron core at a location such that the distance between the center of said movable iron core and said slide ball bearing is less than the distance between the center of said movable iron core and said slide bearing, said movable iron core being slidably mounted on said small-diameter portion of said output rod; and
   - means for biasing said movable iron core against said stepped shoulder on said output rod.

2. An electromagnetic solenoid as claimed in claim 1, wherein said slide bearing in said casing end wall is formed of a non-magnetic material.

3. An electromagnetic solenoid as claimed in claim 1, wherein said output rod is formed of a non-magnetic material.

4. An electromagnetic solenoid as claimed in claim 1, wherein said fluid control valve includes a valve housing adapted to be connected with the end wall of said casing, said housing having a bore formed therein, and a valve member slidably received in said housing bore and adapted to be coupled to said output rod, wherein the end wall of said casing has a fluid passage formed therethrough for providing fluid communication between the interior of said casing and said housing bore.

5. An electromagnetic solenoid as claimed in claim 1, wherein said fluid control valve includes a valve housing adapted to be connected with the end wall of said casing, said housing having a bofe formed therein, and a valve member slidably received in said housing bore and adapted to be coupled to said output rod, wherein said slide bearing in the end wall of said casing has a fluid passage formed therethrough for providing fluid communication between the interior of said casing and said housing bore.

6. An electromagnetic solenoid as claimed in claim 1, wherein said output rod includes a small-diameter portion and a large-diameter portion with a stepped shoulder defined therebetween, said movable iron core being slidably mounted on said small-diameter portion and biased by a biasing means against said stepped shoulder on said output rod.

7. An electromagnetic solenoid as claimed in claim 2, wherein said output rod is formed of a non-magnetic material.

8. An electromagnetic solenoid adapted to be coupled to a fluid control valve for controlling the operation thereof, said electromagnetic solenoid comprising:
   - a cylindrical casing having an end wall formed at its one end and which is open at its other end;
   - an end cap member attached to the open end of said casing for closing thereof and adapted to cooperate with said casing to form a yoke for a magnetic circuit;
   - a hollow solenoid coil accommodated in said casing;
   - a fixed iron core disposed in and fixedly mounted on said casing;
   - a slide bearing disposed in the end wall of said casing;
   - a slide ball bearing disposed in said end cap member;
   - an output rod disposed in said casing with its one end extending outwardly through the end wall of said casing, said output rod slidably extending through said fixed iron core and supported on its opposite ends by the slide bearing and the slide ball bearing; and
   - a movable iron core received in said solenoid coil and firmly mounted on said output coil in a face-to-face relation with said fixed iron core at a location such that the distance between the center of said movable iron core and said slide ball bearing is less than the distance between the center of said movable iron core and said slide bearing, and
said fluid control valve including a valve housing adapted to be connected with the end wall of said casing, said housing having a bore formed therein, and a valve member slidably received in said housing bore and adapted to be coupled to said output rod, wherein said slide bearin in the end wall of said casing has a fluid passage formed therethrough for providing fluid communication between the interior of said casing and said housing bore.

* * * * *